United States Patent
Scolnicov et al.

(10) Patent No.: US 10,242,414 B2
(45) Date of Patent: Mar. 26, 2019

(54) METHOD FOR LOCATING A LEAK IN A FLUID NETWORK

(75) Inventors: Haggai Scolnicov, Tel Aviv (IL); Amitai Armon, Tel Aviv (IL); Chaim Linhart, Petach Tikva (IL); Lilach Bien, Rehovot (IL)

(73) Assignee: TaKaDu Ltd., Yehud (IL)

( * ) Notice: Subject to any disclaimer, the term of this patent is extended or adjusted under 35 U.S.C. 154(b) by 633 days.

(21) Appl. No.: 13/494,411

(22) Filed: Jun. 12, 2012

(65) Prior Publication Data
US 2013/0332397 A1    Dec. 12, 2013

(51) Int. Cl.
| F17D 5/02 | (2006.01) |
| G06Q 50/06 | (2012.01) |
| G05B 13/02 | (2006.01) |
| G06N 5/02 | (2006.01) |
| G06F 11/00 | (2006.01) |
| G01M 3/24 | (2006.01) |
| G01M 3/28 | (2006.01) |

(52) U.S. Cl.
CPC ............... *G06Q 50/06* (2013.01); *F17D 5/02* (2013.01); *G01M 3/243* (2013.01); *G01M 3/28* (2013.01); *G05B 13/02* (2013.01); *G06F 11/00* (2013.01); *G06N 5/02* (2013.01)

(58) Field of Classification Search
CPC ........ G05B 13/02; G06Q 50/06; G06Q 10/06; F17D 5/02; G01M 3/243; G01M 3/28
See application file for complete search history.

(56) References Cited

U.S. PATENT DOCUMENTS

| 4,361,030 A | 11/1982 | Heide |
| 4,407,158 A | 10/1983 | Petroff |
| 4,712,182 A | 12/1987 | Wakamori et al. |
| 4,796,466 A | 1/1989 | Farmer |
| 4,797,621 A | 1/1989 | Anderson et al. |
| 5,301,538 A | 4/1994 | Recla |
| 5,315,529 A | 5/1994 | Farmer |
| 5,546,789 A | 8/1996 | Balke et al. |
| 5,708,195 A | 1/1998 | Kurisu et al. |

(Continued)

FOREIGN PATENT DOCUMENTS

| DE | 102008048748 | 9/2008 |
| EP | 0521548 | 1/1993 |

(Continued)

OTHER PUBLICATIONS

US 7,223,843 B1, 06/2007, Budhraja et al. (withdrawn)

(Continued)

*Primary Examiner* — Michael P Harrington
(74) *Attorney, Agent, or Firm* — Meister Seelig & Fein LLP; Seth H. Ostrow

(57) ABSTRACT

Methods and systems are described for providing cost effective leak detection in a fluid network. Step testing procedures are represented by decision trees and associated expected costs are calculated. Selection of step testing procedures is optimized for low expected cost. The total expected cost rate for a network configuration may be calculated from the rate of leak occurrence and the optimal expected costs associated therewith. Network configuration changes may be recommended by optimizing for total expected cost rate for a fluid network.

18 Claims, 11 Drawing Sheets

(56) References Cited

U.S. PATENT DOCUMENTS

| | | | |
|---|---|---|---|
| 5,756,880 A | 5/1998 | Chen et al. | |
| 5,883,815 A | 3/1999 | Drakulich et al. | |
| 6,067,477 A | 5/2000 | Wewalaarachchi et al. | |
| 6,076,048 A | 6/2000 | Gunther et al. | |
| 6,088,417 A | 6/2000 | Jax et al. | |
| 6,109,096 A | 8/2000 | Chen et al. | |
| 6,147,613 A | 11/2000 | Doumit | |
| 6,336,131 B1 | 1/2002 | Wolfe | |
| 6,477,434 B1 | 11/2002 | Wewalaarachchi et al. | |
| 6,526,358 B1 | 2/2003 | Mathews, Jr. et al. | |
| 6,556,924 B1* | 4/2003 | Kariyawasam et al. | 702/34 |
| 6,687,637 B2 | 2/2004 | Garabedian | |
| 6,691,724 B2 | 2/2004 | Ford | |
| 6,845,336 B2 | 1/2005 | Kodukula et al. | |
| 6,862,540 B1 | 3/2005 | Welch et al. | |
| 6,963,808 B1 | 11/2005 | Addink et al. | |
| 6,970,808 B2 | 11/2005 | Abhulimen et al. | |
| 6,985,779 B2 | 1/2006 | Hsiung et al. | |
| 6,985,831 B2 | 1/2006 | Ito et al. | |
| 6,993,403 B1 | 1/2006 | Dadebo et al. | |
| 6,995,846 B2 | 2/2006 | Kalayeh et al. | |
| 7,107,280 B2 | 9/2006 | Tomic et al. | |
| 7,119,698 B2 | 10/2006 | Schleich et al. | |
| 7,135,956 B2 | 11/2006 | Bartone et al. | |
| 7,228,726 B2 | 6/2007 | Kates | |
| 7,233,876 B2 | 6/2007 | Halstead et al. | |
| 7,263,459 B2 | 8/2007 | Ito et al. | |
| 7,283,913 B2 | 10/2007 | Garnaes | |
| 7,310,590 B1 | 12/2007 | Bansal | |
| 7,330,796 B2 | 2/2008 | Addink et al. | |
| 7,412,876 B2 | 8/2008 | Kates | |
| 7,424,399 B2 | 9/2008 | Kahn et al. | |
| 7,437,267 B2 | 10/2008 | Oka et al. | |
| 7,504,964 B2 | 3/2009 | Brennan et al. | |
| 7,523,016 B1 | 4/2009 | Surdulescu et al. | |
| 7,526,944 B2 | 5/2009 | Sabata et al. | |
| 7,529,644 B2 | 5/2009 | Lenz et al. | |
| 7,536,371 B2 | 5/2009 | Hartman et al. | |
| 7,558,703 B2 | 7/2009 | Stouopis et al. | |
| 7,558,771 B2 | 7/2009 | Barajas et al. | |
| 7,587,481 B1 | 9/2009 | Osburn, III | |
| 7,647,136 B2 | 1/2010 | McDowell | |
| 7,669,461 B2 | 3/2010 | Kates | |
| 7,670,494 B2 | 3/2010 | Frank | |
| 7,680,611 B2 | 3/2010 | Guidi et al. | |
| 7,698,073 B2 | 4/2010 | Wolfe | |
| 7,720,615 B2 | 5/2010 | Kim | |
| 7,739,004 B2 | 6/2010 | Johnson | |
| 7,793,188 B2 | 9/2010 | Mukhopadhtat et al. | |
| 7,844,419 B1 | 11/2010 | Gurrieri et al. | |
| 7,920,983 B1 | 4/2011 | Peleg et al. | |
| 2002/0116282 A1 | 8/2002 | Martin et al. | |
| 2003/0101009 A1 | 5/2003 | Seem | |
| 2005/0190074 A1 | 9/2005 | Cumeralto et al. | |
| 2005/0246112 A1 | 11/2005 | Abhulimen et al. | |
| 2006/0179463 A1 | 8/2006 | Chisholm et al. | |
| 2007/0016399 A1 | 1/2007 | Gao et al. | |
| 2007/0083398 A1 | 4/2007 | Ivey et al. | |
| 2007/0203860 A1 | 8/2007 | Golden et al. | |
| 2007/0219728 A1 | 9/2007 | Papageorgiou et al. | |
| 2007/0233397 A1 | 10/2007 | Kim | |
| 2007/0247331 A1 | 10/2007 | Angelis et al. | |
| 2007/0288200 A1* | 12/2007 | Guidi et al. | 702/179 |
| 2008/0109175 A1 | 5/2008 | Michalak | |
| 2008/0168339 A1 | 7/2008 | Hudson et al. | |
| 2008/0250497 A1 | 10/2008 | Mullarkey et al. | |
| 2009/0299660 A1 | 12/2009 | Winter | |
| 2009/0327071 A1 | 12/2009 | Kreft | |
| 2010/0169477 A1 | 7/2010 | Stienhans et al. | |
| 2011/0215945 A1 | 9/2011 | Peleg | |
| 2013/0262068 A1* | 10/2013 | Israeli | F17D 5/02 703/9 |

FOREIGN PATENT DOCUMENTS

| | | |
|---|---|---|
| EP | 0298479 | 9/1996 |
| EP | 0821817 | 6/1999 |
| EP | 1047925 | 3/2004 |
| EP | 0925491 | 5/2004 |
| EP | 1324165 | 11/2007 |
| EP | 1867970 | 12/2007 |
| EP | 1133690 | 11/2008 |
| EP | 2060896 | 5/2009 |
| GB | 2478432 | 4/2011 |
| WO | 20020832 | 4/2000 |
| WO | 200194937 | 12/2001 |
| WO | 200245315 | 6/2002 |
| WO | 2002086670 | 10/2002 |
| WO | 2004113863 | 12/2004 |
| WO | 2005094493 | 10/2005 |
| WO | 2007002838 | 1/2007 |
| WO | 2008016697 | 2/2008 |
| WO | 2008029681 | 3/2008 |
| WO | 2008067442 | 6/2008 |
| WO | 2008094551 | 8/2008 |
| WO | 2009055342 | 4/2009 |
| WO | 2010035281 | 4/2010 |

OTHER PUBLICATIONS

Zimmer, B., and R. Clayton. "7 Steps to Predictive Leak Testing." Control Engineering 52.7 (2005): IP9-12. ProQuest. Web. Nov. 8, 2018. (Year: 2005).*

Cort, Adam. "The Latest in Leak Detection." Assembly, vol. 52, No. 13, 2009, pp. 36-38. ProQuest, https://search.proquest.com/docview/199499020?accountid=14753. (Year: 2009).*

Danilo Mandic, et al. "Data Fusion for Modern Engineering Application: An Overview", ICANN 2005, LNCS 3697, pp. 715-721 (2005).

Sholom M. Weiss and Nitin Indurkhya. Predictive Data Mining: A Practical Guide. Morgan Kaufmann, 1997, p. 147.

ABB Group (2009) "Solutions for the Water Cycle Leakage Management", ABB Water Industrial Sector Initiative, 26 slides (pages); state retrieved from http://www.abb.com/industries/db0003db004063/a0a4683761017bb2c12574bb002be3b5.aspx.

Stephen Mounce, et al. (2006) "Burst Detection Using Hydraulic Data From Water Distribution Systems With Artificial Neural Networks", Urban Water Journal, pp. 12 pages, UK.

Dalius Misiunas (2005) "Failure Monitoring and Asset Condition Assessment in Water Supply Systems", Doctoral Dissertation in Industrial Automation Department of Industrial Electrical Engineering an Automation, Lund University, Sweden, 349 pages. http://www.abb.com/industries/db0003db004063/a0a4683761017bb2c12574bb002be3b5.aspx.

ABB Industry Pte Ltd., (2003) "Advise IT Water Leakage Management", 6 pages; state retrieved from http://www.abb.com/industries/db0003db004063/a0a4683761017bb2c12574bb002be3b5.aspx.

Frenk Withoos, et al. (2004) "Leak Manager, Analysis and Management of Water Leakage in Potable Water Distribution Networks Using Advise IT Water Leakage Management", ABB Review, Innovative Engineering, pp. 61-63; state retrieved from http://www.abb.com/industries/db0003db004063/a0a4683761017bb2c12574bb002be3b5.aspx.

Ivan Stoianov, et al. (2007) Pipenet: A Wireless Sensor Network for Pipeline Monitoring, in IPSN07: 264-273. ACM, 2007, USA, 10 pages.

Gabrys, B. and Bargiela, A. "Simulation of Water Distribution Systems". in: the European Simulations Symposium (ESS'98), Oct. 26-28, 1998, Nottingham, UK, pp. 273-277.

Mamlock, R. and Al-Jayyousi, O. "Fuzzy Sets Analysis for Leak Detection in Infrastructure Systems: A Proposed Methodology". in: Clean Technology Environmental Policy 6, pp. 26-31, 2003.

Centre for Water Systems: A Leading Center for Water Engineering Research in the UK. vol. II, Issue 2, Autumn 2009 <http://centres.exeter.ac.uk/cws/downloads/doc_download/53-cws-newsletter-volume-2-issue-2>.

(56) References Cited

OTHER PUBLICATIONS

U.M. Shamsi, "GIS Applications for Water, Wastewater, and Stormwater Systems", 2005, Taylor & Francis, 48 pages.
"Thames Water Utilities," 2007, 259 pages.
"GIS implementation for water and wastewater treatment facilities", 2005, Water Environment Federation, pp. 81-107.
Alexandru Aldea et al., "Network modeling solution for water supply using GIS concepts." 2008, Conferinta International: "Solutii pentra sisteme de alimentaire cu apa si canalizare in localitati pana a la 10000 locuitori", pp. 202-208.
S.S. Skiena, "The Algorithm Design Manual", 2008, 2nd edition, Springer-Verlag, pp. 145-190, 475-522, 523-561.
Judith L. Gersting, "Mathmatical Structures for computer science", 6th edition, 2007, W.H. Freeman and Company, pp. 520-527.
"Water Infrastructure Monitoring", 2010 Wayback Machine entry for http://www.takadu.com/files/Brochure/TaKaDuOnePager.pdf, 2 pp.
Samir Khuller et al.; "Fault tolerant K-center problems", 2000, Theoretical Computer Science, vol. 242, pp. 237-245.
"NetworX GIS Shapefile", 2011, http://networkx.lanl.gov/reference/readwrite.nx_shp.html, 1 pp.
Ines Slama et al. Energy Efficient Scheme for Large Scale Wireless Sensor Networks With Multiple Sinks, 2008, IEEE Wireless Communications an Networking Conference 2008, pp. 2367-2372.

\* cited by examiner

METHOD FOR LOCATING A LEAK IN A FLUID NETWORK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

The present application is related to:

U.S. patent application Ser. No. 12/717,944, entitled "SYSTEM AND METHOD FOR MONITORING RESOURCES IN A WATER UTILITY NETWORK," filed on Mar. 5, 2010, now issued as U.S. Pat. No. 7,920,983;

U.S. patent application Ser. No. 13/008,819, entitled "SYSTEM AND METHOD FOR IDENTIFYING LIKELY GEOGRAPHICAL LOCATIONS OF ANOMALIES IN A WATER UTILITY NETWORK," filed on Jan. 18, 2011;

U.S. patent application Ser. No. 13/313,261, entitled "SYSTEM AND METHOD FOR IDENTIFYING RELATED EVENTS IN A RESOURCE NETWORK MONITORING SYSTEM," filed on Dec. 7, 2011; and U.S. patent application Ser. No. 13/371,911, entitled "SYSTEM AND METHOD FOR ANALYZING GIS DATA TO IMPROVE OPERATION AND MONITORING OF WATER DISTRIBUTION NETWORKS," filed on Feb. 13, 2012; the disclosures of which are hereby incorporated herein by reference in their entirety.

FIELD OF THE DISCLOSURE

The disclosure herein relates to the management and maintenance of fluid resource distribution networks such as utility water distribution networks. In particular the disclosure relates to improved methods for locating leaks in fluid networks.

BACKGROUND

The United Nations notes that water use has been growing at more than twice the rate of population increase in the last century, and an increasing number of regions are chronically short of water. By 2025 two-thirds of the world's population could be under water stress conditions as a result of population growth and other factors. Water, especially potable water, is essential for all socio-economic developments and for maintaining a healthy population. As populations increase across the globe they call for an increased allocation of clean water for use, resulting in increased water scarcity.

A significant amount of water may be conserved merely by addressing the loss of water or degradation in water quality in systems caused by leaks or other adverse effects. Thus, one method of addressing water scarcity and conserve resources is to improve the operation, monitoring and maintenance of the utility networks used to deliver water, such as by faster and more accurate detection of leaks and other events occurring in such networks. Several systems currently exist to facilitate improved network monitoring in water utility networks. For example, commonly owned and above referenced U.S. Pat. No. 7,920,983, entitled "SYSTEM AND METHOD FOR MONITORING RESOURCES IN A WATER UTILITY NETWORK," which is herein incorporated by reference in its entirety, describes sophisticated systems and methods for detecting anomalies in water utility networks using statistical and analytical techniques, some of which are in use by the assignee of the present invention, TaKaDu Ltd. Other systems available from other companies, such as those available from ABB Group or IBM Corp., also provide some improvements to anomaly detection in water utility networks.

One way in which the operation and monitoring of water utility networks may be further improved is by making better use of data from Geographical Information Systems ("GIS"s or "GIS systems") and asset management systems. As known to those of skill in the art, a GIS integrates, stores, and displays geographic information about a network or system laid out in a physical environment. Applications using GIS allow users to create interactive queries, review spatial information, edit data and maps, and present the results of these operations in a graphical user interface. Further description and details of GIS systems may be found in "Getting Started with Geographic Information Systems," Second Edition by Keith C. Clarke, which is hereby incorporated by reference in its entirety. As is also known to those of skill in the art, asset management systems store information about physical components of a network or a system such as a water utility network, such as pipes or joints, and are used in the operation and management of networks such as in fixing network components or in ordering new or replacement components. Commercially available asset management systems used to manage water utility network assets are available from a variety of entities, as known to those of skill in the art. Techniques and systems for improving the accuracy and completeness of GIS data are described in commonly owned and above referenced U.S. patent application Ser. No. 13/371,911, entitled "SYSTEM AND METHOD FOR ANALYZING GIS DATA TO IMPROVE OPERATION AND MONITORING OF WATER DISTRIBUTION NETWORKS," which is incorporated herein by reference.

The physical components of a water distribution network are typically situated underground and out of sight. As a result, leaks in the network are often hard to detect until leaked water or its effects become visible above ground and are reported to the network manager. By the time such hidden leaks are discovered a great deal of water may be lost and damage caused. The cost of such hidden leaks may include direct costs, such as cost of water lost or electricity consumed as a result of the leak, as well as indirect costs, such as cost of repair of damage caused by the leak or fines incurred due to the leak. It will be appreciated that the cost of any leak will typically increase the longer the leak remains undetected.

Because hidden leaks are hard to predict and to detect, utilities may carry out ongoing maintenance projects, such as replacing pipes and other equipment in order to prevent future leaks from developing. It will be appreciated that ongoing maintenance is labor intensive and costly and can be unnecessarily wasteful, for example when an old but functioning component is needlessly replaced.

In order to detect hidden leaks, utilities may run large-scale acoustic surveys aiming to identify hidden leaks which have not reached the surface. Such leaks may then be targeted for repair. However, such large-scale acoustic surveys are generally ad hoc and highly inefficient.

There is therefore a need for a more cost effective method for locating hidden leaks and identifying improved if not the best target locations for acoustic inspections. The present disclosure addresses this need.

SUMMARY

Methods and systems are provided for providing expected cost for locating a leak in a fluid network. One such method is a computer implemented method comprising: for each leaf node of a decision tree of a step testing procedure, computing a probability $prob_{loc}$ of a leak being located in an associated section of the fluid network, for each leaf node of the step testing procedure decision tree, computing a cost $f_{loc}$ of locating the leak in the associated section of the fluid network; and calculating the sum of the products of $prob_{loc}$ and $f_{loc}$ for all leaf nodes of the step testing procedure, the sum being the expected cost of locating the leak in the fluid network.

Optionally, the step of determining the cost $f_{loc}$ of locating a leak in a section of the fluid network comprises determining a valve configuration cost $f_{valves}$ due to closing and reopening valves during the step testing procedure. Optionally, the step of determining the cost $f_{loc}$ of locating a leak in a section of the fluid network comprises determining a shutdown costs $f_{shut}$ due to shutting down service during the step testing procedure. Optionally, the step of determining the cost $f_{loc}$ of locating a leak in a section of the fluid network comprises determining a loss cost $f_{loss}$ due to expenses incurred as a result of the leak itself during the step testing procedure. Optionally, the step of determining the cost $f_{loc}$ of locating a leak in a section of the fluid network comprises determining an inspection cost $f_{inspect}$ incurred by the inspection of the associated section of the fluid network.

Variously, the probability $prob_{loc}$ of a leak being located in an associated section of the fluid network may be determined by analyzing historical data stored in a database. Additionally or alternatively, the probability $prob_{loc}$ of a leak being located in an associated section of the fluid network is determined by analyzing flow data obtained from at least one network fluid monitor.

Further methods and systems are provided for locating leaks identified in a fluid network. One such computer implemented method may comprise: representing, in computer readable form, at least one step testing procedure, usable to locate the identified leak, selecting, by computer, a step testing procedure having a low expected cost; and applying the selected step testing procedure. Optionally, the step of representing at least one step testing procedure may comprise constructing a decision tree.

Where appropriate, the step of selecting a step testing procedure may comprise performing an optimization algorithm on a set of step testing procedures. Additionally or alternatively, the step of selecting a step testing procedure may further comprise using expected cost as a target function. Accordingly, the expected cost may be calculated by: for each leaf node of a decision tree of the step testing procedure determining a probability probloc of a leak being located in an associated section of the fluid network; for each leaf node of the step testing procedure determining a cost floc of locating the leak in the associated section of the fluid network; and calculating the sum of the products of probloc and floc for all leaf nodes of the step testing procedure.

Additionally or alternatively, the step of selecting a step testing procedure may comprise: generating at least one candidate step testing procedure; calculating expected costs for the at least one candidate step testing procedure; applying an optimization algorithm directed towards generating new step testing procedures having low expected cost; and repeating the steps of generating, calculating and applying an optimization algorithm until an optimal step testing procedure is obtained.

Furthermore, the step of selecting a step testing procedure may optionally comprise: calculating an expected cost value for the plurality of step testing procedures for the fluid network; and selecting the step testing procedure having the lowest expected cost out of the plurality of step testing procedures.

Other methods and systems are provided for providing the total expected cost rate for a network configuration. One possible computer implemented method, may comprise, for example, obtaining at least one possible leak type; determining a predicted occurrence rate rateleak for each of the at least one possible leak type; calculating expected cost T(s)leak of a step testing procedure for each possible leak type; and calculating the sum of the products of rateleak and T(s)leak for all leaf nodes of the step testing procedure the sum being the total expected cost rate for the network configuration. Optionally, the predicted occurrence rate rateleak is determined by analyzing historical data.

Still other methods and systems are provided for recommending at least one network configuration for a fluid network. For example one computer implemented method may comprise: obtaining a space of candidate network configurations; and performing an optimization algorithm on the space of candidate network configurations. Optionally, the step of obtaining a space of candidate network configurations may comprise: obtaining k candidate locations for network assets; and generating a plurality of k-tuples comprising k elements each representing at least one network element occupying the a corresponding location or the absence of a network element at the location.

Additionally or alternatively, the step of performing an optimization algorithm may comprise: selecting a set of candidate network configurations from the space; calculating a fitness score for each candidate network configuration of the set; determining if a termination requirement has been met; if a termination requirement has been met then recommending at least one optimal network configuration; and if a termination requirement has not been met then selecting a new set of candidate network configurations and repeating the steps of calculating and determining.

Accordingly, the step of selecting a set of candidate network configurations may comprise obtaining at least one qualification criterion; selecting candidate network configurations meeting the at least one qualification criterion. Additionally or alternatively, the step of calculating the fitness score may comprise calculating expected cost rate for each candidate network configuration. Optionally, the step of calculating the fitness score may comprise calculating a ratio of expected cost rate to conversion cost for each candidate network configuration. Where appropriate, the method may further comprise a step of reporting no suggestion if no optimal network configuration has been selected within a time limit.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1:
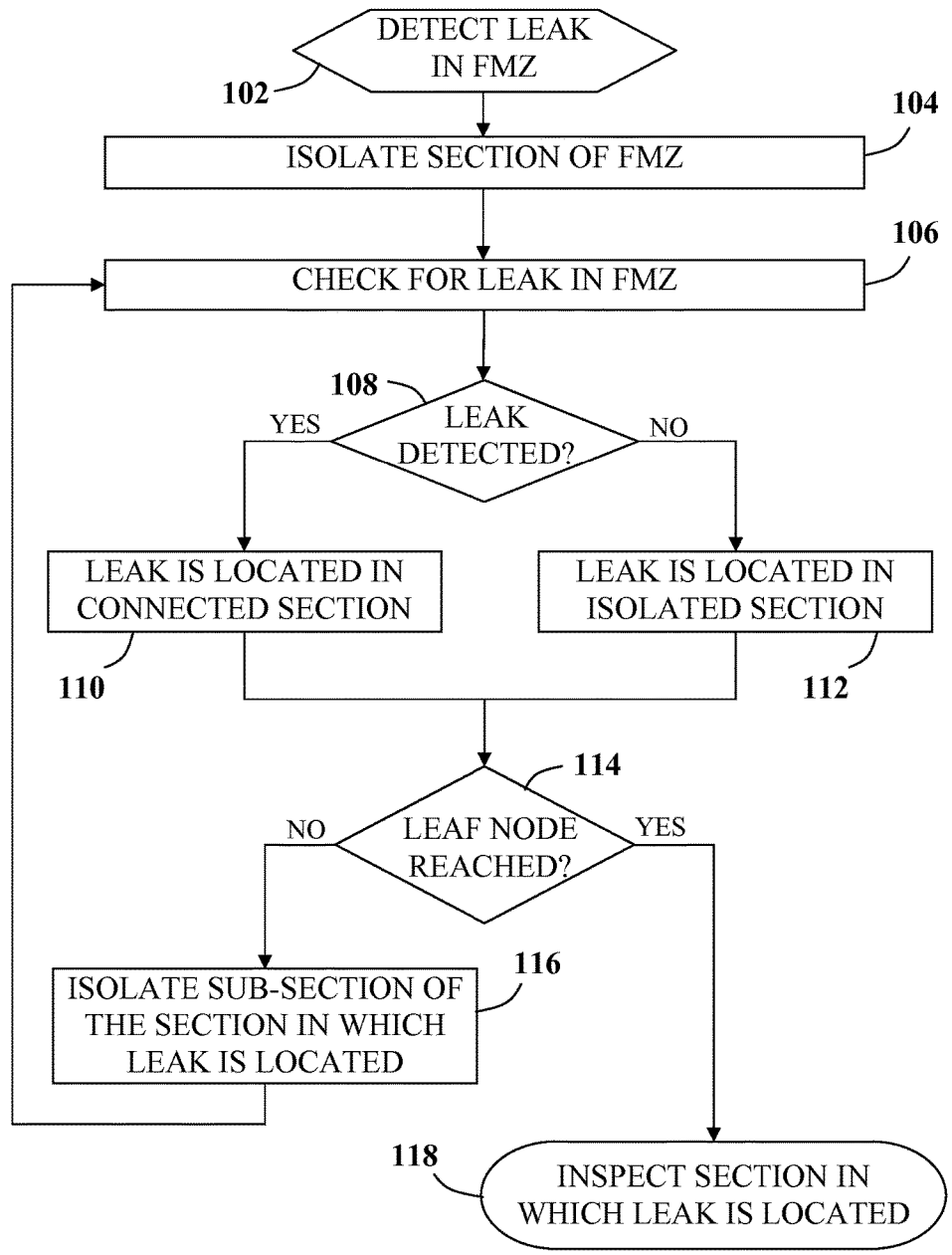
FIG. 1 is a flowchart representing a possible step testing method which may be used to narrow down the location of a leak within a flow monitoring zone (FMZ) in which it has been detected.

Aspects of the present disclosure relate to cost effective methods for locating leaks identified in fluid networks. Leaks may be detected in a particular region of a fluid distribution network or flow monitoring zone (FMZ), for example by detecting an anomaly in meter data recorded by meters such as flow meters and pressure sensors situated in the fluid network. A step testing procedure is selected which has a low expected cost. The selected step testing procedure may be used to narrow the location of the leak to within a limited section of the fluid network. The size of the limited section may be determined by the smallest region that may be subdivided from the network by valves. The limited section is generally of a size suitable for inspection, such as acoustic or visual inspection to be carried out in a cost effective manner.

Optionally, the step testing procedure may be selected by applying an optimization algorithm to determine the step testing procedure having the lowest expected cost out of a plurality of possible step testing procedures. As outlined in detail with reference to FIG. 4 hereinbelow, the expected cost of a step testing procedure may be determined by summing the products of cost and probability for all leaf nodes of the step testing procedure, each leaf node corresponding to a different limited section of the fluid network in which the leak may be identified.

It is noted that the systems and methods of the disclosure herein may not be limited in its application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be limiting.

In general, step testing is, in the context of a typical fluid distribution or collection network, a leak location methodology based on shutting down different parts of the network in sequence so as to narrow the location of a leak to smaller and smaller sections of a fluid network. Step testing may be useful when the flow monitoring zone in which a leak has been detected is large and manual inspection over the whole zone may be very costly, labor intensive or time consuming. Step testing is also useful when inspection techniques such as acoustic testing are inapplicable or ineffective, for example due to background noise, sound absorbent pipe materials or the like.

Reference is made to the flowchart of FIG. 1 representing a possible step testing method used to narrow down the location of a leak within a particular flow monitoring zone (FMZ) in which it has been detected. The FMZ may be a zone of a fluid distribution network for which the net supply of fluid is known. The net supply of fluid may be determined, for example, by adding the inlet values and subtracting the outlet values recorded by flow meters monitoring flow through the boundary of the FMZ.

A leak may be detected in the FMZ 102, for example by detecting an unexpectedly high fluid consumption within the FMZ. For example, it is noted that network fluid monitors such as flow meters and pressure monitors and the like may be used in combination with GIS data to determine the fluid flow into and out of an FMZ and so to identify anomalous readings indicating that a leak lies somewhere within the FMZ. For example the fluid flow through the FMZ may be higher than expected by a margin indicative of a leak of a certain size. Techniques and systems for identifying leaks and their general geographic or topological location are described in detail in the above referenced commonly owned patent and patent applications, including U.S. Pat. No. 7,290,983 and application Ser. No. 13/008,819, both incorporated herein by reference. However, meter readings analyzed using such systems may not be able to narrow the location of the leak to a smaller sub sections, at which point step testing can be used is pinpoint the location further.

In a step testing procedure, a first section of the FMZ may be isolated 104, for example by shutting down fluid flow to the selected section, and a check may be carried to determine if the leak is still present in the FMZ 106. For example, the selected section of the FMZ may be shut off for a test period by closing selected valves in the network. The network monitors may then be used to monitor fluid flow into and, where applicable, out from the FMZ. It is noted that the expected flow through the FMZ having an isolated section may be proportional to the number of service connections in the isolated section.

After a section of the FMZ has been isolated the leak may or may not be detected in the FMZ 108. If the leak is still detected in the FMZ even after the section has been isolated then the leak is deemed to be located in the connected section 110. On the other hand, if no leak is detected in the FMZ after the section has been isolated then the leak is deemed to be located in the isolated section 112.

For example, if the flow through the FMZ after the isolated section has been shut off matches the expected flow corrected for the proportion of the isolated section, then this indicates that the leak lies in the isolated section. However, if the flow through the FMZ is found to be higher than the expected proportion by the margin indicative of the detected leak this may indicate that the leak lies in the connected section.

Having narrowed the location of the leak, if a leaf node has not been reached 114, the method may proceed by isolating a sub section of the section in which the leak is located 116 and repeating the procedure. The method may continue to narrow the location of the leak into smaller and smaller subsections until a leaf node, corresponding to a limited section of the fluid network, is reached. When the system identifies that a leaf node has been reached 114, an inspection team may be sent to carry out an inspection of only the limited section wherein the leak is located 118.

It is noted that it is possible that more than one leak may be present in the same FMZ. For example, when a leak is detected in the FMZ after a section has been isolated, however the magnitude of the detected leak is smaller than the originally detected leak, and this may indicate that at least two leaks are present, at least one in the isolated section and at least one in the connected section. Accordingly, further step testing may be carried out on both the isolated and connected sections separately.

Step testing may be an expensive and time-consuming procedure. In a water distribution network, in order to reduce costs and to improve the quality of the tests, step testing may be carried out at night, when water consumption is more stable, and background noises are minimal. Furthermore, disruption to consumers is generally lower at nighttime.

Figure 2:
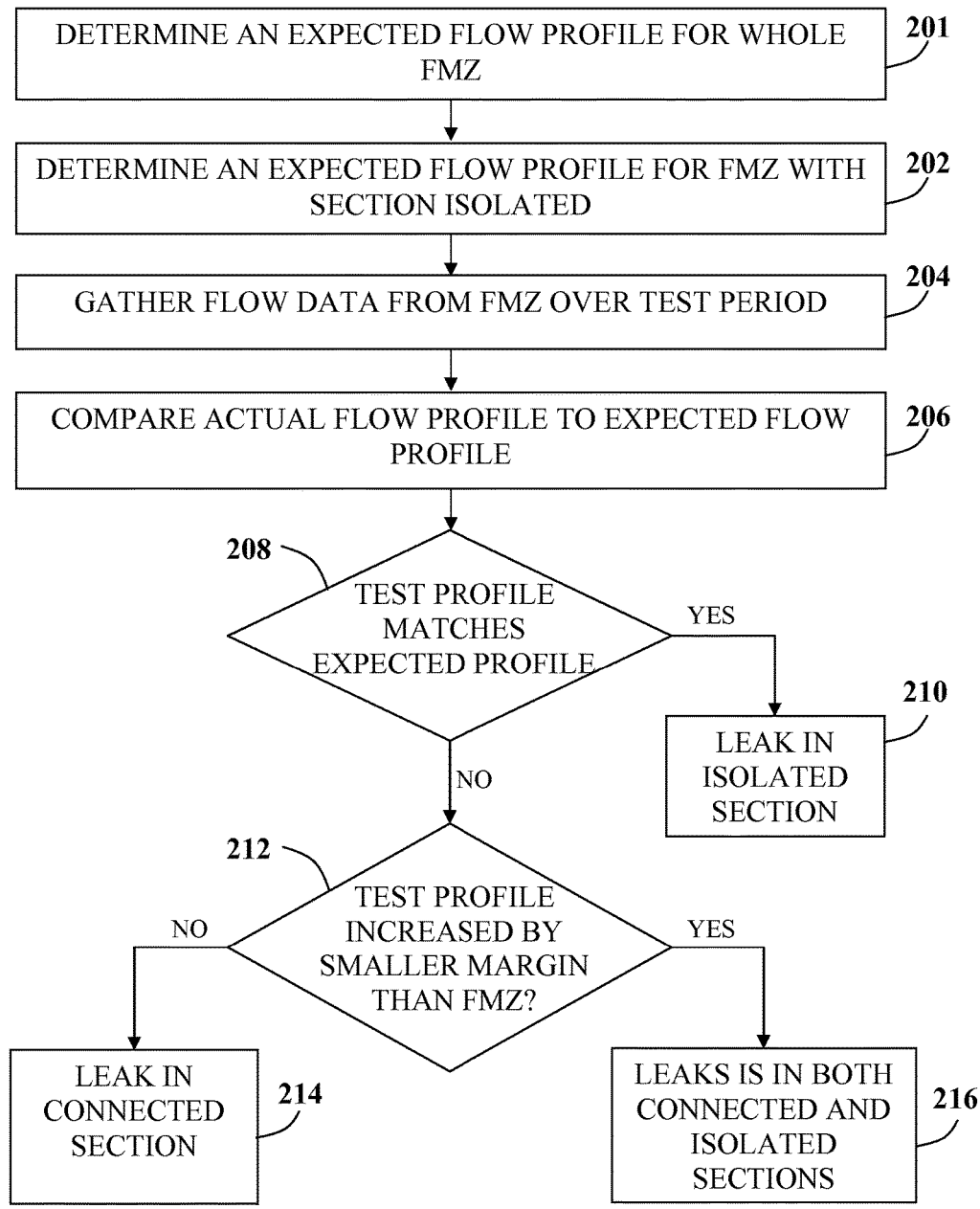
FIG. 2 is a flowchart representing a possible method for identifying in which section of an FMZ a leak is located.

A possible method for determining where a leak is located in an FMZ is outlined in the flowchart of FIG. 2. An expected flow profile for the whole FMZ for the duration of the test period may be determined 201, for example through analysis of historical data relating to fluid flow through the FMZ, data relating ambient factors such as weather, calendar events and the like, as outlined in the commonly owned U.S. Pat. No. 7,920,983, entitled "SYSTEM AND METHOD FOR MONITORING RESOURCES IN A WATER UTILITY NETWORK" which is incorporated by reference herein in its entirety.

The expected flow profile for the FMZ with a section isolated may be determined 202 from the expected flow profile determined for the whole FMZ. For example the expected flow profile for the FMZ may be reduced by a proportion calculated by taking the ratio of pipe-length in the isolated section with the total pipe length for the whole FMZ. Alternatively or additionally, the expected flow profile for the FMZ may be reduced by a proportion calculated by taking the ratio of the number of consumers in the isolated section with the number of consumers in the whole FMZ. Other methods for determining an expected flow profile for the FMZ with a section isolated will occur to those skilled in the art.

For the duration of a test period, flow data may be gathered 204. For example, data may be collected from fluid monitors such as flow meters, pressure meters and the like for the duration of the test. Accordingly an actual flow profile may be calculated for the FMZ with an isolated section. The actual flow profile may be compared to the expected flow profile for the FMZ having an isolated section 206.

If the test profile matches the expected profile 208 then a leak may be deemed to have been located in the isolated section of the FMZ. If the test profile does not match the expected profile then a leak may be deemed to have been located in the connected section of the FMZ 214. It is further noted that if the test profile is increased by a smaller margin than the profile for the whole FMZ 212 then there may be two leaks or more including at least one leak in the connected section and at least one leak in the isolated section of the FMZ 216.

Figure 3:
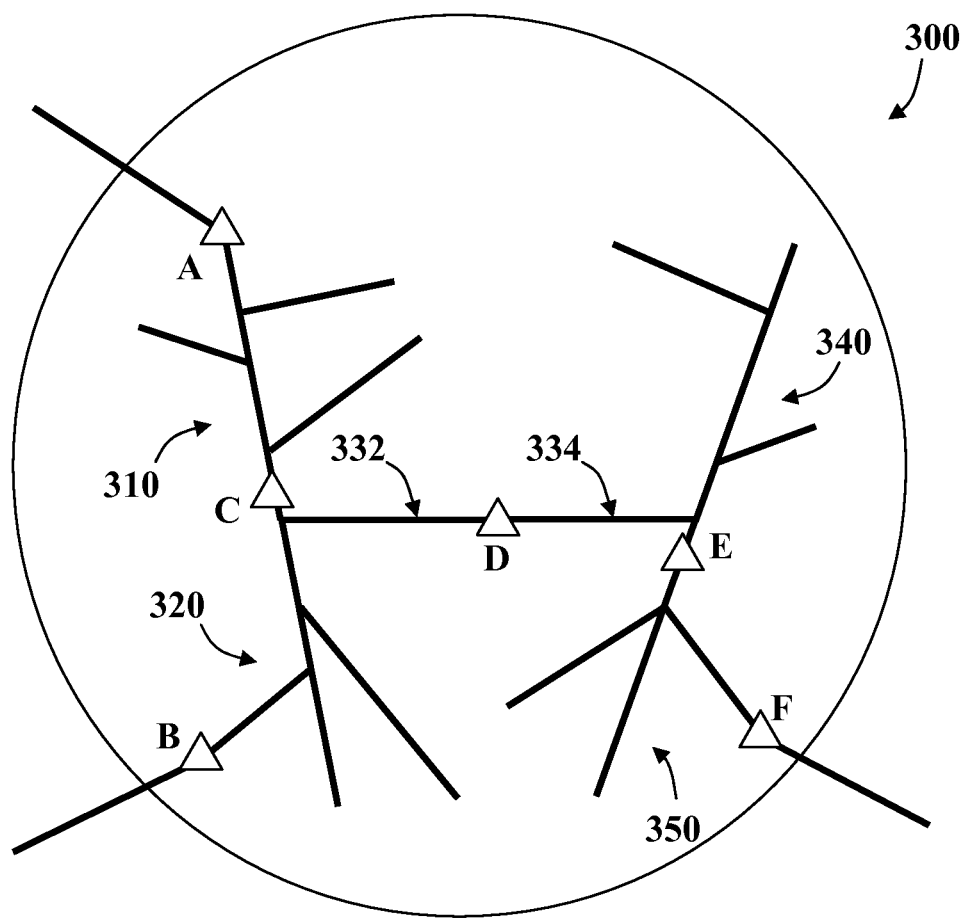
FIG. 3 is a network trace representing an example of a possible flow monitoring zone.

For illustrative purposes only and so as to clarify the method of the disclosure, reference is now made to FIG. 3 representing a network trace of an example of a flow monitoring zone (FMZ). The FMZ is a pipe network including a plurality of pipe sections, represented by linking lines and a plurality of valves A-F indicated by triangles.

Figure 4:
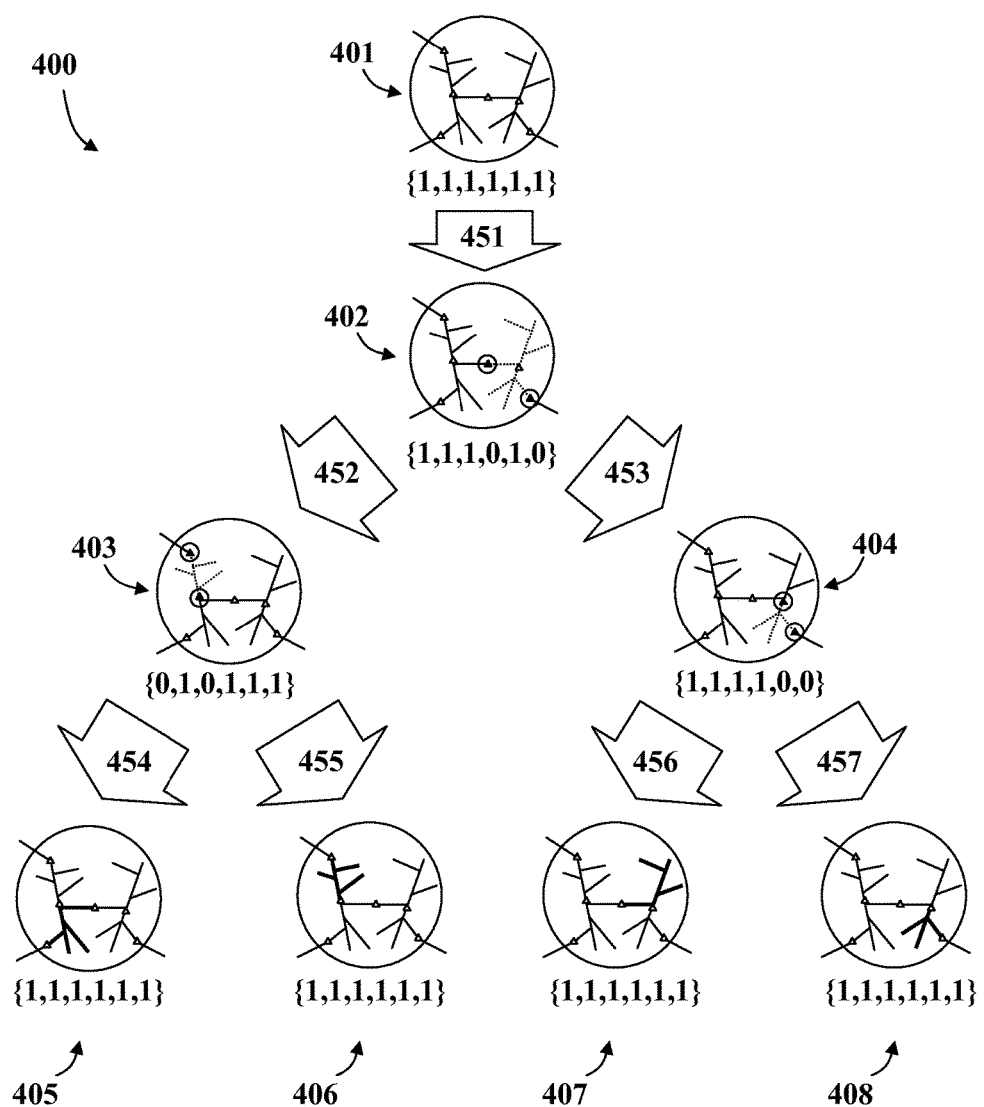
FIG. 4 represents a possible step testing procedure for locating a leak within the flow monitoring zone represented in the network trace of FIG. 3.

Referring now to FIG. 4 a decision tree representing one possible step testing procedure (STP) is presented which may be used to locate a leak identified in a flow monitoring zone (FMZ) 300 such as illustrated by the network trace of FIG. 3. The step testing procedure may be represented by a branching tree 400 connecting a set of nodes 401-408. Each node represents a possible step in the step testing procedure during which a section of the FMZ is isolated and the FMZ tested for leaks. For convenience, a node configuration may be represented by a state vector identifying the state of each valve in the FMZ in the form $$\{State_{valveA}, State_{valveB}, State_{valveC}, State_{valveD}, State_{valveE}, State_{valveF}\}$$

where $State_{valveN}=1$ where valve N is open and $State_{valveN}=0$ where valve N is closed.

The root node 401 represents the un-sectioned FMZ. The state vector for the root node 401 may be represented by the state vector $\{1,1,1,1,1,1\}$ indicating that all valves A, B, C, D, E and F (using the labels of FIG. 3) are open. Typically a leak is initially detected while the FMZ is in this un-sectioned state.

The step testing procedure commences with a first transition 451 to the first branch node 402 by closing two selected valves, valves D and F. For the purposes of illustration, opened valves are indicated on the network trace as white triangles and closed valves are represented as black triangles, emphasized by a bounding circle. Accordingly the first branch node 402 may be represented by the state vector {1,1,1,0,1,0}. Thus a first section of the FMZ is isolated as illustrated by the dotted line in the FMZ network trace of the first branch node 402.

In order to determine whether the leak is in the connected or the isolated section of the FMZ, the FMZ may be left in this configuration for a test period long enough for the presence of a leak to be detected. As described above, the leak may be deduced to be somewhere in the connected section if a leak is still detected even after the isolated section is closed off. On the other hand, if no leak is detected in the FMZ during the test period, then the leak may be deduced to be somewhere in the isolated section.

Thus, if a leak is detected in the FMZ during the test period of the first branching node 402, and the leak is deduced to be in the connected section, the step testing procedure may continue to the second transition 452 by the opening of valves D and F and the closing of valves A and C. Accordingly, the first isolated section may be reconnected and the step testing may continue to the next branch node 403, represented by the state vector {0,1,0,1,1,1}, in which a new section of the FMZ is isolated. The location of the leak may be further narrowed by leaving the FMZ in this configuration and testing for a leak for another test period.

Similarly, returning to the first branching node 402, if no leak is detected in the FMZ during the test period, then the leak is deduced to be in the isolated section of the first branching node configuration 402. The step testing procedure may continue to the third transition 453 by the opening of valve D and the closing of valve E. Accordingly, the step testing may continue to the next branch node 404, represented by the state vector {1,1,1,1,0,0}, in which a new section of the FMZ is isolated and the FMZ may again be left in for a test period.

By successive branching, the location of the leak may be narrowed down to be within smaller and smaller sections of the FMZ until the location of the leak is known to lie in a small enough section of the FMZ that inspection may be carried out in a cost effective manner. Inspection of the section may use a variety of techniques such as acoustic testing, visual examination or the like as known in the art.

By way of example, the step testing procedure 400 of FIG. 4 is shown to have four leaf nodes 405, 406, 407, 408. Each leaf node is characterized by a section of the network which may be inspected, as illustrated by the bold lines in their respective FMZ network traces. It will be appreciated that other step testing procedures may have more or fewer leaf nodes as applicable.

It is noted that a manual network manager may select a step testing procedure based upon simplicity. For example, a naïve operator, lacking sufficient data to determine probabilities as described below, may assume that all leaf nodes have equal chance of being the final node of the step testing procedure. Accordingly, manually selected step testing procedures tend to resemble the tree 400 of FIG. 4 rather than the more complicated trees 500A, 500B of FIGS. 5A and 5B. However, this may result in a procedure being adopted which is more costly or expensive than necessary. The current disclosure teaches an optimization algorithm which may be used to select the most cost effective step testing procedure option available.

Expected Cost of a Step Testing Procedure

It is a feature of the present disclosure that for any given leak type, an expected cost T(s) may be determined for a particular step testing procedure. The expected cost T(s) may be calculated by determining, for each leaf node, a probability $\text{prob}_{loc}$ and a cost $f_{loc}$ associated with identifying the leak in the section of the FMZ identified at the node. The expected cost T(s) of an step testing procedure may be calculated by summing the products of cost and probability for all leaf nodes of the step testing procedure. This may be represented as:

$$T(s) = \sum_{loc} \text{prob}_{loc} f_{loc}$$

Thus, in order to calculate the expected cost of a step testing procedure, it is useful to assign a probability $\text{prob}_{loc}$ to each leaf node. A value for the probability of a leak occurring in any given node may be determined in an number of ways. By way of a simple example, the probability of a leak occurring in a particular section of pipe may be assumed to be equal to the ratio of the pipe length of that section $L_{section}$ to the total pipe length of the whole FMZ $L_{FMZ}$.

More sophisticated methods for assigning probability values to each node will consider additional factors which may be available from the GIS layers, such as the average age of pipes in the section to be inspected, the maximum age of all pipes in a given section, the nature and number of connectors, valves and the like in the section to be inspected. In addition, other data influencing the probability of a section developing a leak may be available from the metered data, for example the nature and size of the leak in question. It will be appreciated, therefore, that the probability of each leaf node of a step testing procedure may be a complex function of multiple factors.

It is noted that, the probability of a leak being in a certain section may be determined using additional data for example gathered from the historical record of maintenance and flow behavior for the FMZ or from geolocation algorithms and the like such as described in the applicant's co-pending patent application Ser. No. 13/008,819, which is incorporated herein by reference.

Accordingly leakage-prone areas within the network may be identified that should be targeted for maintenance or acoustic inspection. Step testing procedures may therefore be preferred where leaf nodes associated with leakage prone areas, and having high probability of developing leaks, are reached earlier in the procedure.

Selected probability effecting factors that may increase the rate of leaks in a specific section of an FMZ include:
  The average and/or maximum age of hardware of the section, such as pipes, fittings and valves and so on;
  The complexity of the network section, e.g., number of pipes, fittings, valves of various types, service connections and the like;
  Geographical properties contributing to more leaks remaining unnoticed and therefore unreported, such as areas near rivers/coast, where wet ground is not unusual or areas with soft land for example where ground may dry more quickly;

Sections having particularly high pressure, or a large variability of pressure, such as may be inferred from:
Direct sources such as pressure meter readings or the like, and
Indirect sources such as topographical data associated with the section, where large differences in elevation within a common pressure zone may suggest that the pressure in the low elevation points is probably higher;
A predicted high rate of leaks/bursts in the section as estimated for example from:
Analysis of historical repair files, or
Computational analysis of historical data from flow and pressure meters as outlined in the commonly owned U.S. Pat. No. 7,920,983.

Accordingly, several leak-related parameters may be analyzed to provide data relevant to the probability of a leak being detected in any given section. For example records may be kept of the leak frequency giving the number of leaks per day per kilometer of pipe. Other records may include the water loss rate, providing the total amount of water lost per day per kilometer of pipe. It may also be useful to record the hidden time, or the average time taken for a leak of a given type being detected in a given location (perhaps using analysis of the historical meter data to estimate the start time of the leak). Still further records may be kept outlining the total cost of a particular leak, summing all relevant costs, e.g., due to water loss, repairs, collateral damage, regulator fines and the like.

Various techniques may be used to gather reliable data for use in determining probabilities and costs for use in the calculation of estimated costs for a step testing procedure. For example machine-learning techniques may be applied by building a training set of data including historical data gathered from various sections of the network and the associated rates and costs of leaks developed therein during a certain time period. For each section of the training set of data the above factors may be deduced or computed. Accordingly, a machine-learning black-box may be executed to optimize the parameters for a model that accurately predicts the recorded leakage rates in the training set of data from the GIS information and historical meter data including information and data produced using the systems described in the above referenced U.S. Pat. No. 7,290,983 and application Ser. No. 13/371,911. A plurality of machine-learning approaches may be used as required such as linear/non-linear regression, decision trees, neural networks, k-nearest neighbor, support vector machines, optimization techniques or the like as will occur to those skilled in the art. The best performing approach may be selected.

The model generated using the training data set may be used to compute features computed for the up-to-date meter data to obtain predicted leakage rates for all analyzed areas. Where appropriate, these predictions may be applied when prioritizing field work or determining the total expected cost of any step testing procedure.

Node Costs

The costs $f_{loc}$ associated with each leaf node may be found by summing various costs incurred at all the nodes and transitions along the branch leading to the leaf node. Thus, for example, contributions to the overall cost of the leaf node may include the valve configuration costs $f_{valves}$ due to closing and reopening valves during all the transitions along the branch, the shutdown costs $f_{shut}$ due to shutting down water service to each customer during test periods, the loss costs $f_{loss}$ due to expenses incurred as a result of the leak itself, and the inspection costs $f_{inspect}$ incurred by the inspection of the section of the FMZ identified as the location of the leak. Accordingly the costs associated with each leaf node may be given from the following equation:

$$f_{loc}=f_{valves}+f_{shut}+f_{loss}+f_{inspect}.$$

It is further noted that each of the cost contributions $f_{valves}$, $f_{shut}$, $f_{loss}$, $f_{inspect}$ may be functions of various parameters. So, for example, the valve configuration costs $f_{valves}$ associated with the closing and opening of the valves may be the same for all valves, or may depend on the type and location of the valves involved, in particular a remote-controlled valve could be closed and opened at negligible cost.

Similarly, the shutdown costs $f_{shut}$ associated with shutting down the water service to each customer may be a fixed cost for all customers per unit of time. Accordingly, the costs $f_{shut}$ may be represented as a linear function of number of customers and duration of the shutdown. Alternatively, the shutdown costs $f_{shut}$ may not be independent of customer type, for example, a higher cost may be incurred for disconnecting a hospital, a school, a large industrial customer or the like. Additionally or alternatively shutdown costs $f_{shut}$ may not vary linearly with time, for example where a regulator may imposes additional fines when customers are disconnected for too long.

The loss costs $f_{loss}$ associated with losses from the leak itself may include direct costs, such as cost of water lost or electricity consumed as a result of the leak, as well as indirect costs, such as cost of repair of damage caused by the leak or fines incurred and the like. Where appropriate, such costs may be represented as a function of the leak's magnitude and duration. Furthermore, the loss costs floss may include a factor associated with the risk of the leak developing into a major burst during the step testing procedure. Such a risk may be calculated, for example, by multiplying the total expected cost associated with such a burst by the probability of such a burst occurring in the time taken for the step testing procedure to arrive at the given leaf node.

Inspection costs finspect for finding the exact location of the leak, for example using acoustic techniques, visual inspection or the like, may be a function of the total length of piping of the identified section. It is noted that the function may not be linear as the inspection of different pipes may vary in difficulty depending on their geographical location, for example, visual inspection may be particularly difficult near water sources and the like.

By way of example, referring to the step testing procedure represented in the tree 400 of FIG. 4. Each leaf node 405, 406, 407, 408 may be assigned an associated cost by summing all contributions of branch nodes and transitions leading thereto. So, for example, the cost f405 associated with the first leaf node 405 may be found by summing the costs incurred during the first transition 451, the first branch node 402, the second transition 452, the next branch node 403, the final transition 454 and the inspection costs for examining sections 320 and 332 (FIG. 3) of the FMZ 300.

During the first transition 451, as outlined above, valves D and F are closed incurring an associated valve configuration cost of VD+VF, where VX represents the cost of opening or closing valve X. During the first branch node 402, water supply is shut off for sections 334, 340 and 350 of the FMZ 300 incurring an associated shutdown cost of S334+S340+S350 where Sn represents the cost of shutting down section n for one test period. Furthermore the time taken for the first transition 451 and first branch node 402 may incur an average loss cost of L.

Similarly, the second transition 452, during which valves D and F are reopened and valves A and C are closed, has an associated valve configuration cost of $V_A+V_C+V_D+V_F$. The next branch node 403 will incur an associated shut down cost of $S_{310}$ and a further loss cost of L. It is noted that, although for the sake of simplicity a fixed loss cost L has been assumed for all branching nodes of the example, in practice the loss cost L may vary for each branching node of the system, for example where testing duration varies. The final transition 454, during which valves A and B are reopened, has an associated valve configuration cost of $V_A+V_C$. In addition, inspection costs $I_{332}+I_{320}$ are incurred associated for examining sections 320 and 332 of the FMZ to determine the exact location of the leak.

Accordingly, the total costs associated with the first leaf node 405 may be represented:

$$f_{405} = f_{valves} + f_{shut} + f_{loss} + f_{inspect}$$
$$= (2V_A + 2V_C + 2V_D + 2V_F) + (S_{334} + S_{340} + S_{350} + S_{310}) +$$
$$(2L) + (I_{332} + I_{320})$$

where $V_X$ represents the cost of opening or closing valve X, $S_n$ represents the cost of shutting down section n for one test period, L represents the loss cost contribution of each branching node and $I_n$ represents the cost of inspecting section n.

By a similar analysis of each of the other the branching routes of the step testing procedure, it may be shown that the costs for the other leaf nodes 406, 407 and 408 of the step testing procedure may be represented as follows:

$$f_{406}=(2V_A+2V_C+2V_D+2V_F)+(S_{334}+S_{340}+S_{350}+S_{310})+(2L)+(I_{310})$$

$$f_{407}=(2V_D+2V_E+2V_F)+(S_{334}+S_{340}+2S_{350})+(2L)+(I_{334}+I_{340})$$

$$f_{408}=(2V_D+2V_E+2V_F)+(S_{334}+S_{340}+2S_{350})+(2L)+(I_{350})$$

Accordingly the total expected cost T(400) for the step testing procedure represented by the tree 400 of FIG. 4 may be given by:

$$T(400)=\text{prob}_{405}f_{405}+\text{Prob}_{406}f_{406}+\text{Prob}_{407}f_{407}+\text{Prob}_{408}f_{408}$$

where $\text{prob}_n$ represents the probability of the leak being located by the section identified by node n, which may be determined, for example, using historical meter data, GIS data or the like such as described above.

It is noted that the associated costs of each leaf node will generally depend on the nature of the leak. In particular, the loss costs associated with a larger leak are generally larger than those associated with a smaller leak. Furthermore, as noted hereinabove, the probability assigned to each section may also depend upon the nature of the leak identified. Thus the calculated expected cost T(s), and therefore the optimal step testing procedure will generally vary depending on the leak type.

Figure 5A:
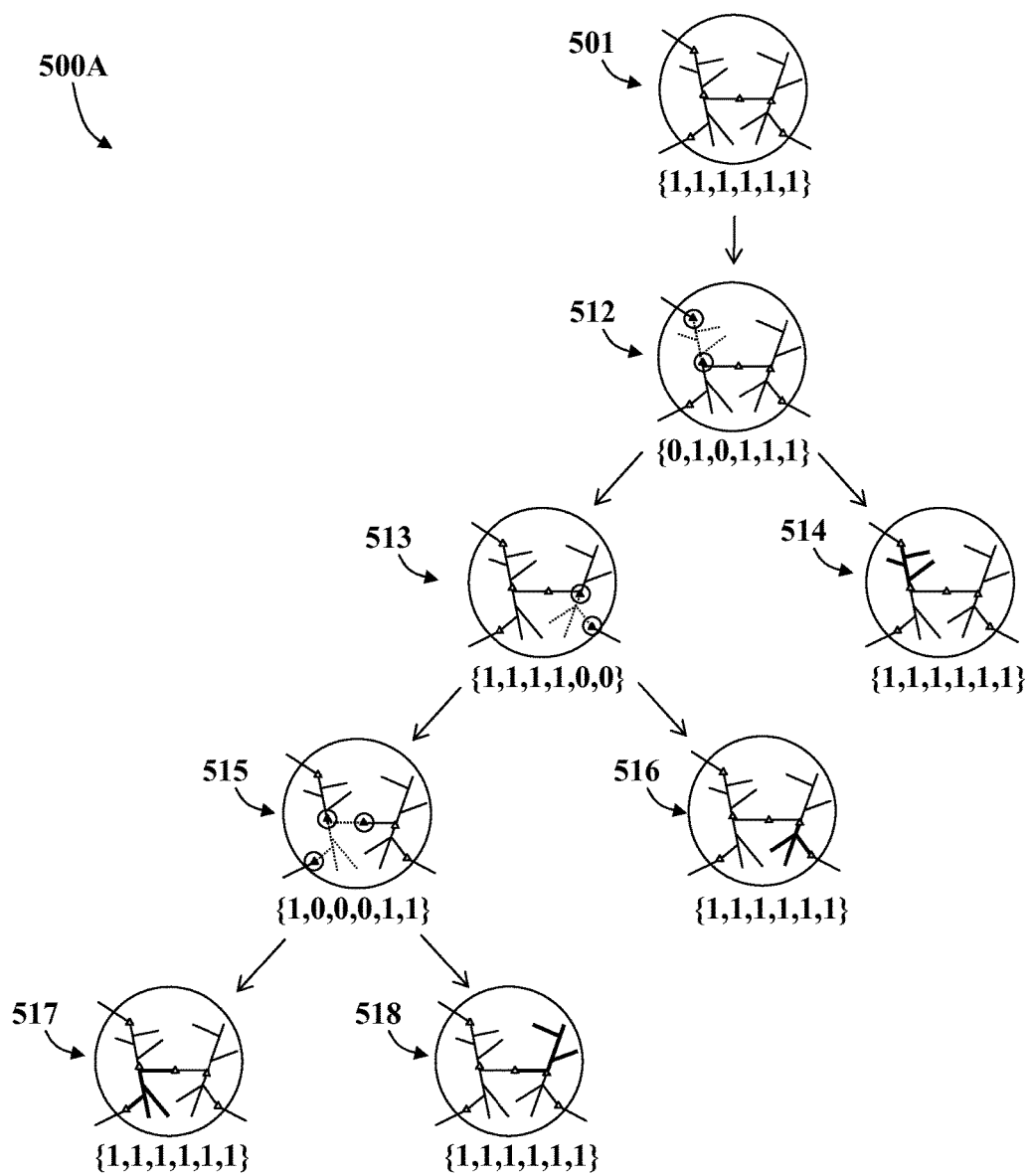
FIGS. 5A and 5B represent two possible alternative step testing procedures for use locating a leak within the flow monitoring zone represented in the network trace of FIG. 3.

It will be appreciated that other step testing procedures for the same FMZ will generally involve different sets of leaf nodes with different associated costs. By way of example reference is made to FIG. 5A illustrating an alternative step testing procedure 500A to the step testing procedure 400 described above in relation to FIG. 4. It is noted that either of the step testing procedures 400 and 500A may be used to locate a leak within the same FMZ 300.

Using notation similar to that used above it may be shown that the associated costs of the leaf nodes of the step testing procedure 500A of FIG. 5A may be given by:

$$F_{514}=(2V_A+2V_C)+(S_{310})+(L)+(I_{310})$$

$$F_{516}=(2V_A+2V_C+2V_E+2V_F)+(S_{310}+S_{350})+(2L)+(I_{350})$$

$$F_{517}=(2V_A+2V_B+4V_C+2V_D+2V_E+2V_F)+(S_{310}+S_{320}+S_{350})+(3L)+(I_{320}+I_{332})$$

$$f_{518}=(2V_A+2V_B+4V_C+2V_D+2V_E+2V_F)+(S_{310}+S_{320}+S_{350})+(3L)+(I_{740}+I_{334})$$

Choosing between step testing procedure 400 or FIG. 4 and the alternative step testing procedure 500A may not be intuitive. As described above, the naïve operator will tend to assume that all leaf nodes have equal probability and so may apply a roughly symmetrical step testing procedure such as step testing procedure 400.

An advantage the method disclosed herein for selecting between step testing procedures may be understood by considering the choice between step testing procedure 400 and step testing procedure 500A. It is apparent that leaf nodes 517 and 518 of step testing procedure 500A all require more steps and incur more loss costs $f_{loss}$ than any of the leaf nodes 405, 406, 407, 408 of step testing procedure 400. Indeed the total costs $f_{517}$, $f_{518}$ involved in locating a leak at any of the leaf nodes 517, and 518 may actually be higher than any of the total costs $f_{405}$, $f_{406}$, $f_{407}$, $f_{408}$. However absolute cost of the nodes may not provide sufficient information regarding the expected cost of the step testing procedures.

The method disclosed herein uses the probabilities associated with each leaf node to weight the cost of each leaf node giving expected costs for each step testing procedure which may be expressed:

$$T(400)\text{prob}_{405}f_{405}+\text{prob}_{406}f_{406}+\text{Prob}_{407}f_{407}+\text{prob}_{408}f_{408}$$

$$T(500A)\text{prob}_{514}f_{514}+\text{prob}_{516}f_{516}+\text{prob}_{517}f_{517}+\text{prob}_{518}f_{518}$$

Accordingly, calculations may be made and the step testing procedure having the lower expected cost of the two may be selected as this will provide the lowest cost on average.

If for example, the probability $\text{prob}_{514}$ of a leak developing in section 310 is particularly high, it may be advantageous to select step testing procedure 500A wherein leaks detected in that section are discovered more quickly. Similarly if the probabilities $\text{prob}_{517}$ and $\text{prob}_{518}$ are particularly low, it may be advantageous to select step testing procedure 500A.

Figure 5B:
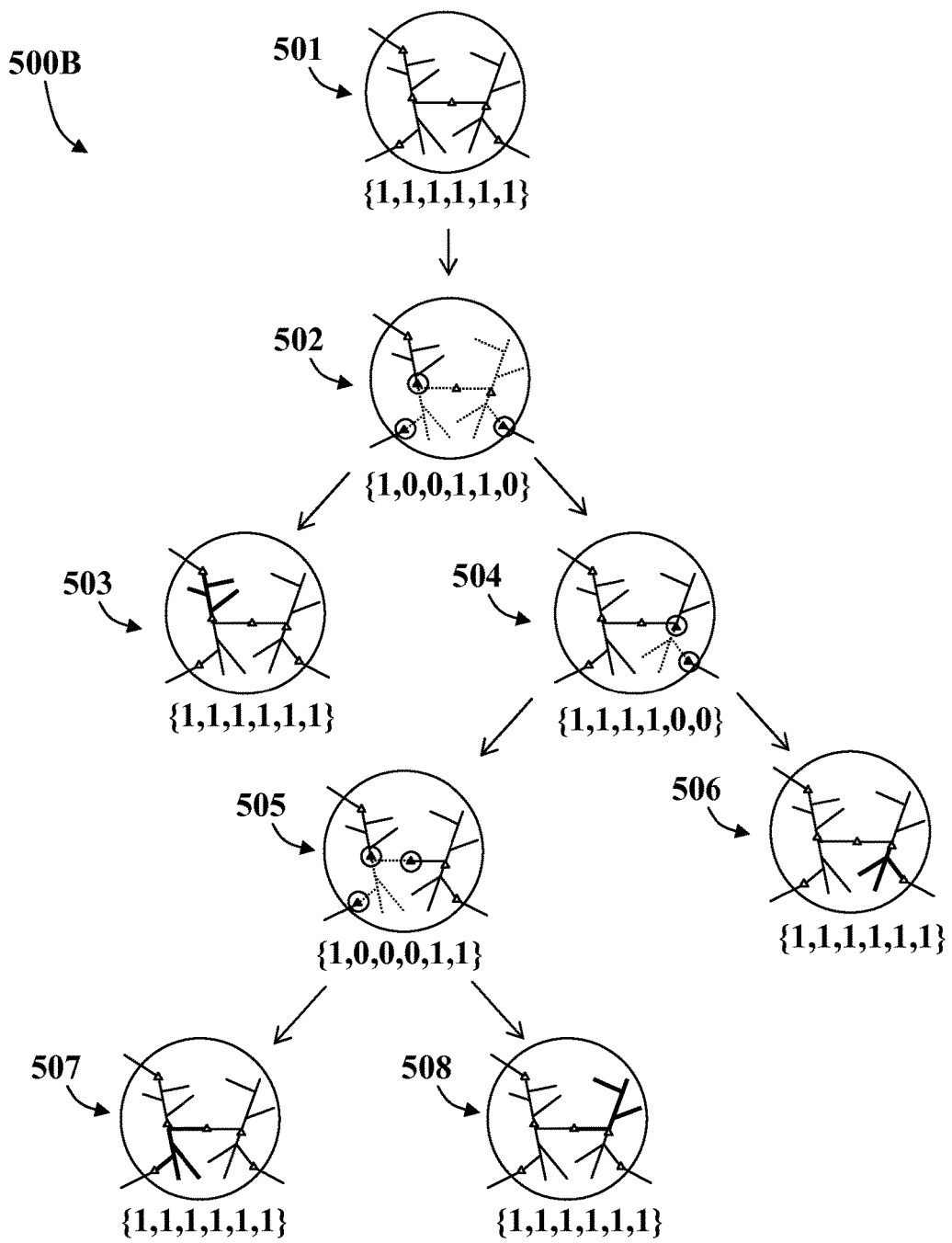

Still another example of the advantage of the method may be illustrated by comparing the step testing procedure 500A with the alternative step testing procedure 500B illustrated in FIG. 5B. It is noted that the step testing procedure 500B differs from step testing procedure 500A only in the first branching node 502, 512. In step testing procedure 500A only section 310 is isolated from the network whereas in step testing procedure 500B the rest of the network is disconnected with only section 310 left connected.

Accordingly, the costs associated with the leaf nodes of the step test procedure 500B may be shown to be:

$$f_{503}=(2V_B+2V_C+2V_F)+(S_{320}+S_{332}+S_{334}+S_{340}+S_{350})+(L)+(I_{310})$$

$$f_{506}=(2V_B+2V_C+2V_E+2V_F)+(S_{320}+S_{332}+S_{334}+S_{340}+2S_{350})+(2L)+(I_{350})$$

$$f_{507}=(4V_B+4V_C+2V_D+2V_E+2V_F)+(2S_{320}+2S_{332}+S_{334}+S_{340}+2S_{350})+(3L)+(I_{320}+I_{332})$$

$$f_{508}=(4V_B+4V_C+2V_D+2V_E+2V_F)+(2S_{320}+2S_{332}+S_{334}+S_{340}+2S_{350})+(3L)+(I_{334}+I_{340})$$

Again, a naïve operator, without access to all the available data, may infer that step test procedure 500B will incur more costs than either step test procedure 400 or step test procedure 500A. However, consider a case in which a hospital or large industrial plant is situated in network section 310 of the FMZ 300. In such a case, for example, the cost of shutting off the network section 310 $S_{310}$ may be particularly high, possibly incurring a fine or the like. Accordingly, it may be preferable to select a step testing procedure such as 500B in which the network section 310 is not shut off. It will be appreciated that similar arguments may be made for step testing procedure 400 with regard to network section 332 or for step testing procedure 500A with regard to network section 334.

Figure 6:
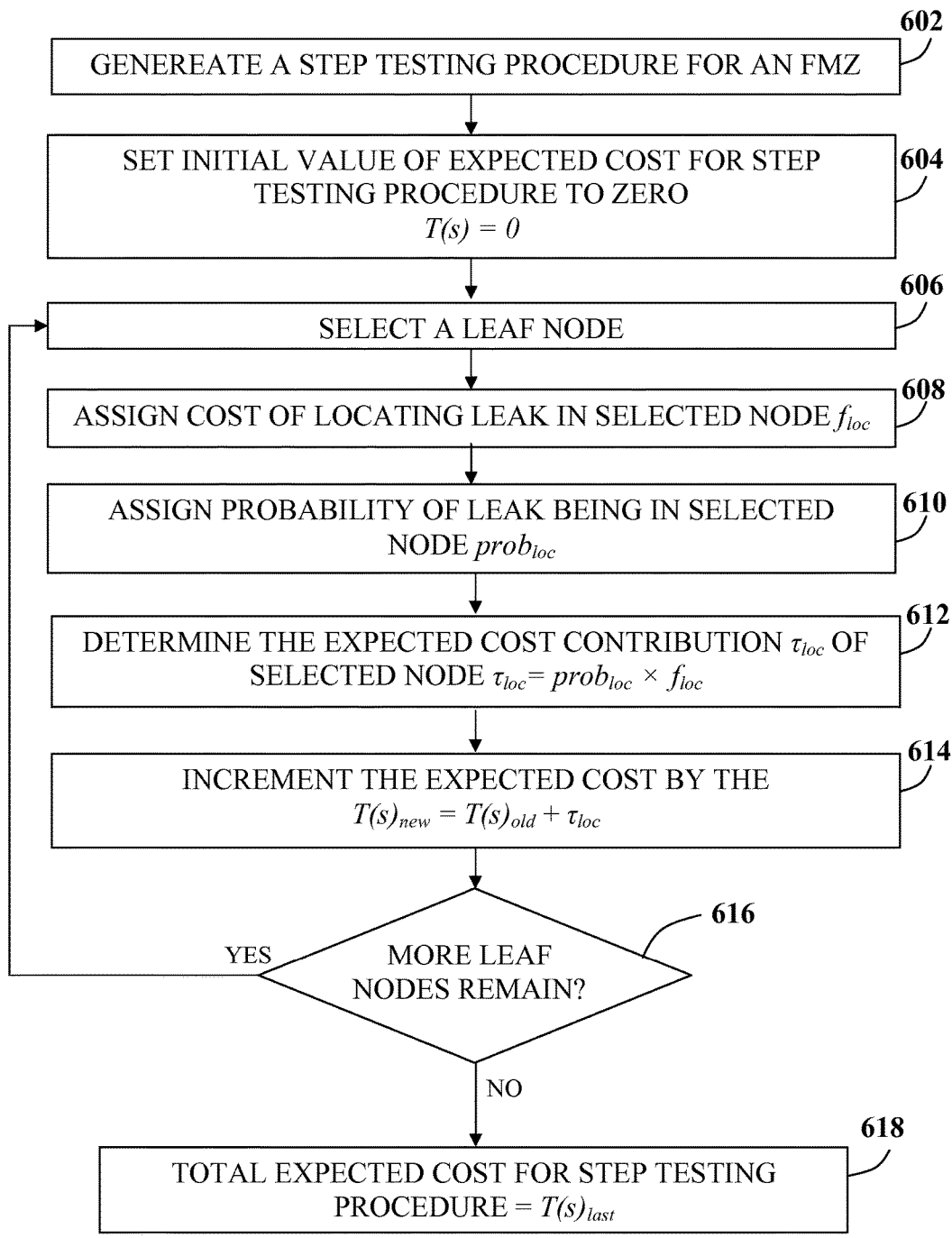
FIG. 6 is a flowchart representing a method for assigning an expected cost to a step testing procedure.

Reference is now made to the flowchart of FIG. 6 representing selected actions involved in a method for assigning a total expected cost to a step testing procedure. A step testing procedure is generated for locating a given link in a flow monitoring zone 602. The initial value of expected cost for the step testing procedure may be set to zero 604. A first leaf node may be selected 606 and a cost $f_{loc}$ assigned thereto such as described herein 608. An associated probability $prob_{loc}$ may be assigned to the leaf node 610. The associated probability may relate to the probability of a leak being produced in the section of the network inspected at that leaf node. The leaf node contribution to the expected cost of the step testing procedure $\tau_{loc}$ may be determined by finding the product of the cost and probability for the leaf node $\tau_{loc}=prob_{loc} \times f_{loc}$ 612. The leaf node increment $\tau_{loc}$ may be added to the value of the expected cost 614. The cycle may be continued until no more leaf nodes remain 616 at which point the final value of the total expected cost T(s) provides the expected cost of the step testing procedure 618.

Figure 7:
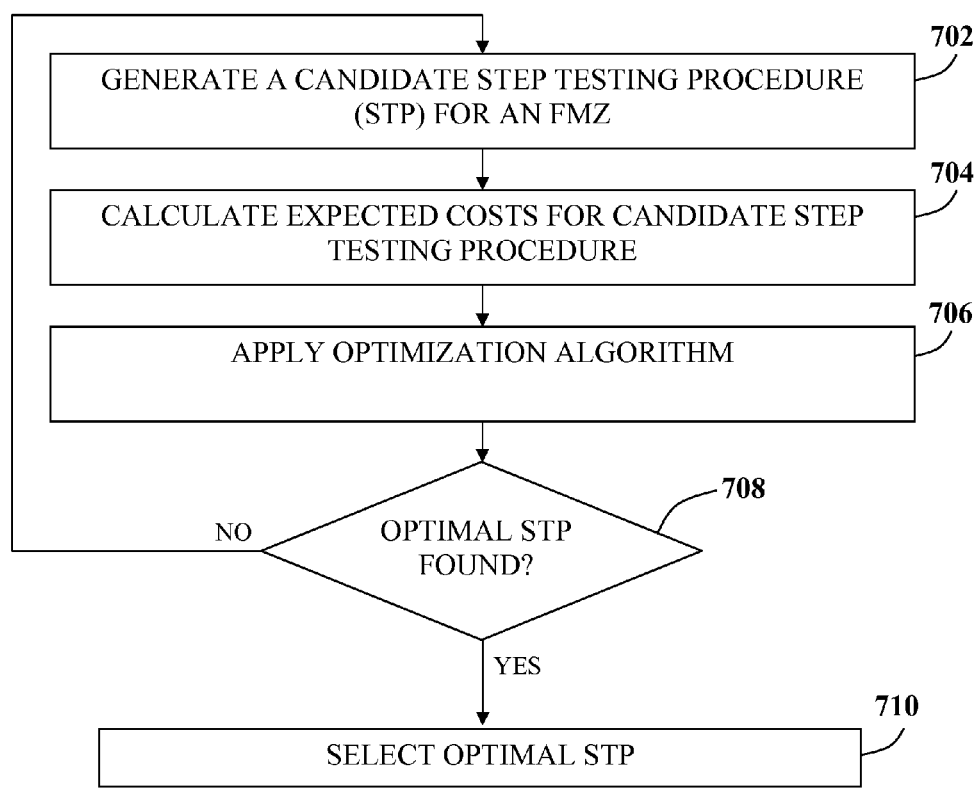
FIG. 7 is a flowchart representing a method for selecting an optimal step testing procedure for a particular leak type.

Referring now to the flowchart of FIG. 7, selected actions are represented of a method for selecting an optimal step testing procedure for a particular leak type identified in a particular flow monitoring zone. A first candidate step testing procedure may be generated 702 and the expected cost for the candidate step testing procedure may be determined 704, for example using the method described herein with relation to FIG. 6. An optimization algorithm may be applied 706 to generate new candidate step testing procedures and the cycle may be repeated until an optimal step testing procedure is found having the lowest expected cost 708. The optimal step testing procedure may be deemed when certain termination requirements have been met, for example when the expected cost is below a certain threshold, when a certain number of iterations have been performed or the like, such as described hereinbelow. Such step testing procedures are deemed "optimal" herein in that they are found through use of one or more optimization algorithms known to those of skill in the art, judged against one or more thresholds, though whether it is possible to find a lower cost step testing procedure will depend on the quality of the data, algorithm used, and other factors known to those of skill in the art.

When the optimal step testing procedure has been found, the optimal step testing procedure may be selected for use in locating the leak in the flow monitoring zone as described herein above 710.

Network Evaluation

Figure 8:
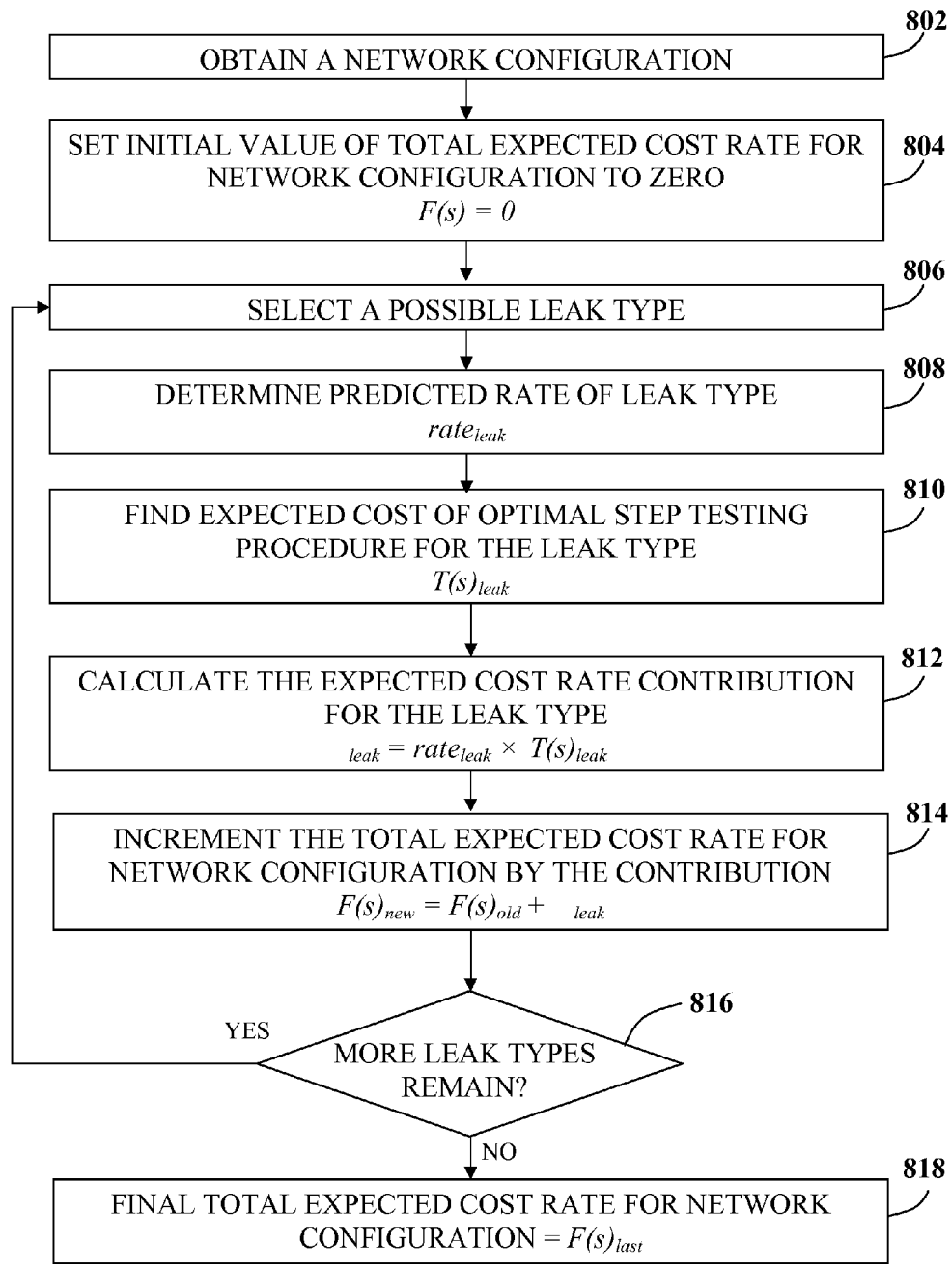
FIG. 8 is a flowchart representing a method for evaluating a network configuration by determining an expected cost of leaks over a time period.

The method described hereinabove for selecting an optimal step testing procedure for a particular leak type may be extended to provide an evaluation method for a fluid network configuration. Referring now to the flowchart of FIG. 8 a possible network evaluation method is taught which may be used to estimate the expected cost of leaks or other faults over a time period in a particular configuration.

The network configuration to be evaluated is obtained 802 and the expected cost rate F(s) may be determined by summing the expected cost rate contributions $_{leak}$ of a plurality of leak types. The expected cost rate F(s) may be considered a measure of the operational expenditure for a given network configuration. A variety of algorithms may be used to generate the total expected cost rate for the particular network configuration.

According to one example the initial expected cost rate F(s) may be set to zero 804 and a possible leak type selected 806. It is noted that each leak type may have a characteristic predicted rate $rate_{leak}$ reflecting the prevalence of that type of leak. The predicted rate of the selected leak type may be determined 808, for example by analyzing historical records relating to the network configuration under evaluation or similar fluid network elements, and may be measured in number of events per month.

The expected cost $T(s)_{leak}$ of the optimal step testing procedure for the selected leak type may be found 810, for example using the method outlined hereinabove. The cost rate contribution $_{leak}$ of the selected leak type may then be calculated 812, for example by multiplying the expected cost with the predicted rate of the selected leak:

$$_{leak}=rate_{leak} \times T(s)_{leak}.$$

The individual cost rate contributions may then be summed for example by incrementing the initial total expected cost rate F(s) by the contribution 814, selecting another leak type 806 until no more leaks remain 816. When all leak types have been assessed for the network configuration then the final total expected cost rate $F(s)_{last}$ may be used as the evaluation of that network configuration.

It is noted that the network configuration evaluation method may be used to quantify the expected future costs of multiple network configuration options. This may be useful, for example, in the design of new fluid networks or in the ongoing maintenance and improvement of existing fluid networks. Accordingly, changes to a network configuration may be assessed as outlined below.

It is further noted that apart from the leak costs, other factors may additionally or alternatively influence the actual expected cost rate F(s). For example the ongoing maintenance cost of the network assets may vary between network configurations and may be included as an additional term in a formula for calculating the total expected cost rate F(s).

Optimization of Network Configurations

A network configuration evaluation method such as described hereinabove may provide a useful metric for optimization algorithms directed towards generating suggested network configurations. Optimization processes may be used to propose network configurations optimized for a variety of parameters such as set-up cost, maintenance cost, efficiency and the like.

The total expected cost rate F(s) may serve as an evaluation to determine the fitness of each network configuration as used in optimization algorithms as known in the art. For example, evolutionary algorithms such as genetic algorithms may require a fitness test or target function to provide a score representing the value of a particular solution such that it may be compared to alternative solutions. Accordingly, the total expected cost rate F(s) may be readily incorporated into a number of known optimization algorithms. These may be used to suggest a network configuration change, such as adding valves at particular locations, in an attempt to maximise the effectiveness of future step testing in the FMZ.

To find an approximate solution to the optimal network configuration, the system may use an optimization algorithm, such as a genetic algorithm or simulated annealing, for example. Network configurations may be represented symbolically. The space of permitted configurations may be limited by some limiting conditions for qualification, depending on the required use. For example, in one embodiment, qualification may be limited by the network conversion cost being below a threshold budget; in another embodiment, the number of valves may be limited by some fixed bound. The target score to be optimised may also depend upon the specific use of network configuration optimization. Optionally, the total expected cost rate $F(s)$ may be used as the target score, and optimization may proceed such as to minimise the value of the total expected cost rate $F(s)$. Alternatively or additionally, the target score to be maximised may be the ratio of improvement in $F(s)$ to conversion cost.

Symbolic Representation of Network Configurations

Figure 9:
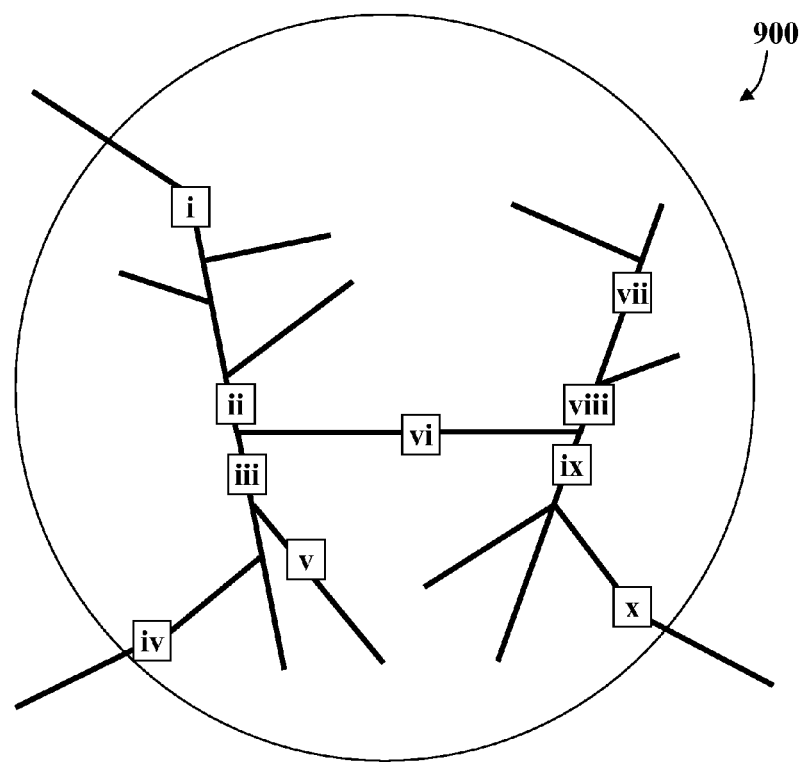
FIG. 9 shows the network trace of the flow monitoring zone of FIG. 3 indicating possible candidate locations for potential hardware changes.

For illustrative purposes only, reference is now made to FIG. 9 showing the network trace of the flow monitoring zone 300 as shown in FIG. 3 and indicating candidate locations i, ii, iii, iv, v, vi, vii, viii, ix and x for potential hardware changes. Network configuration changes may be executing by introducing or removing various network elements to the flow monitoring zone at each of the candidate locations. For example valves, flow meters, pressure sensors or other sensors may be placed at any of the candidate locations i, ii, iii, iv, v, vi, vii, viii, ix and x of the flow monitoring zone 300 of FIG. 3. Furthermore other elements such as piping sections, junctions and the like may be introduced in other candidate locations not shown in FIG. 9.

Accordingly, a network configuration of a flow monitoring zone having k candidate locations for network elements may be represented as a k-tuple with each element of the tuple representing the network element, or lack of a network element, occupying an associated location in the flow monitoring zone. By way of illustration, referring to the flow monitoring zone 300 of FIG. 3, and ignoring piping section changes, each network configuration may be represented by a 10-tuple, where each element of the 10-tuple represents a network element occupying the candidate locations i, ii, iii, iv, v, vi, vii, viii, ix and x.

In a simple analysis, where only a single network element is considered, a binary k-tuple may be sufficient to represent the network configuration wherein each location is marked as being occupied by a valve, or not occupied by a valve. Accordingly, the population of network configurations to be considered may be limited to $2^k$. Thus with ten candidate locations for valves, say, the population may include $2^{10}=1024$ of network configurations. It will be appreciated, however that in practice the set of candidate locations may be much larger and many more network elements may be included. In general, where only one element is added to each candidate location, the population size of a set of network configurations is $(n+1)^k$ where k is the number of candidate locations and n is the number of types of network elements considered.

For optimization algorithms which require a definition of "neighboring" nodes, a discrete metric may be used, as known in the art, for example considering the distance between k-tuples to be the number of coordinates at which their values do not match, so that for example changing the asset at a single possible location is one "step".

Where a large number of candidate locations and network elements are involved, populations of network configurations may be of a size for which an exhaustive evaluation of each network configuration may be impractical, even considering the additional limitations imposed by e.g. a maximum budget to convert the FMZ, or other constraints to sub-spaces of permitted network configurations. Accordingly, approximate optimization methods, such as known in the art may be used.

Figure 10:
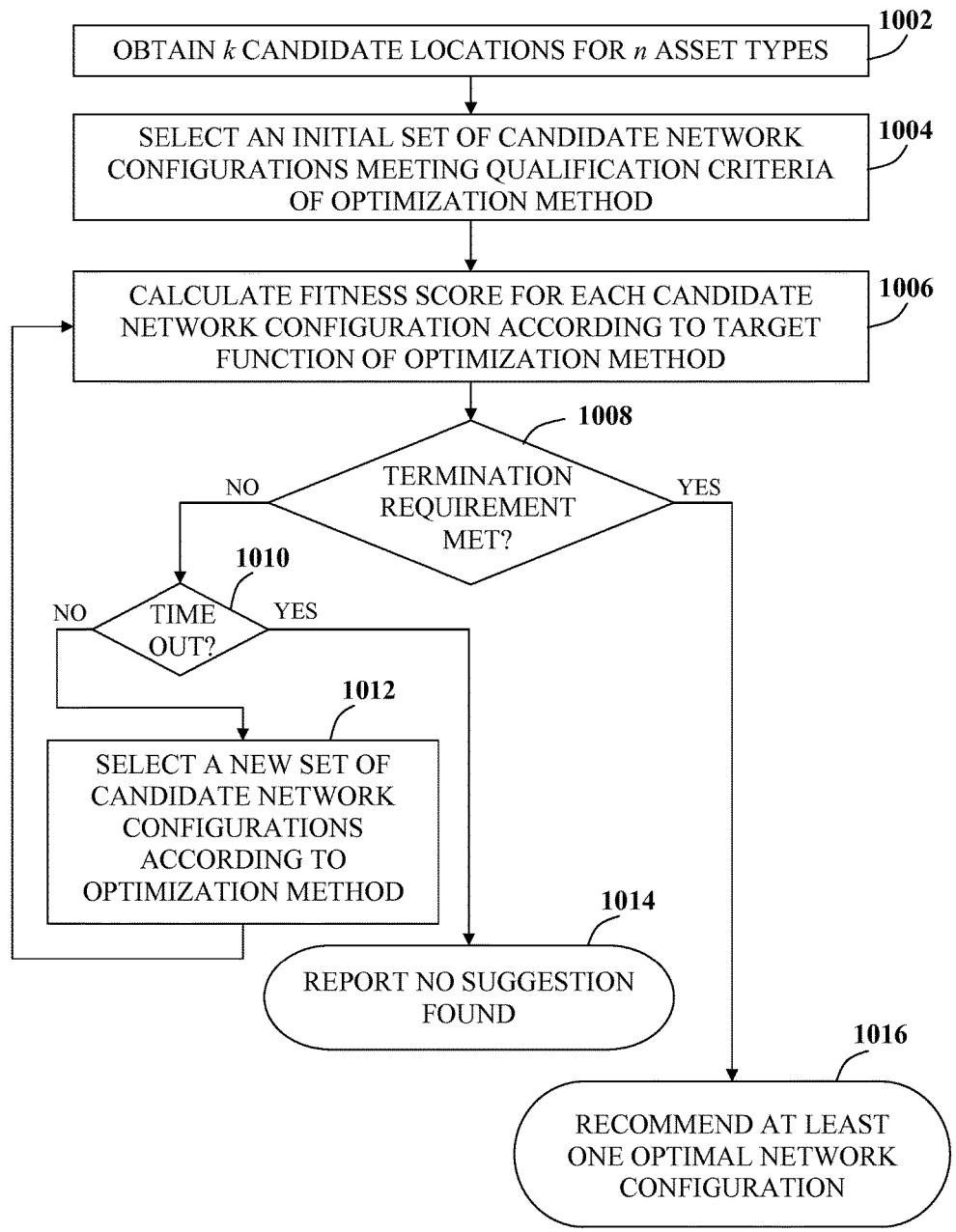
FIG. 10 is a flowchart representing an optimization method for suggesting network configuration changes.

With reference now to the flowchart of FIG. 10, a general method for optimization of network configuration is presented. A network structure may be obtained, for example having k candidate locations for n asset types 1002.

The optimization method may use some qualification criteria to select an initial set of candidate network configurations 1004. By way of example, network configurations may only qualify for the initial set where the total conversion costs are below a limiting threshold. The conversion or changeover cost may include various factors such as the cost of components required to be added to the network, labor costs, disruption to service and the like. Alternatively or additionally, network configuration may only qualify where the total number of valves, pipes or the like in the network does not exceed an upper bound. Still other qualification criteria will occur to those skilled in the art.

For each candidate network configuration of the initial set the optimization method may calculate a target score or fitness function 1006. For example, as described herein, the total expected cost rate $F(s)$ or the ratio of total expected cost rate $F(s)$ to conversion cost may serve as useful fitness functions, alternatively other fitness functions may be used as will occur to the skilled practitioner.

Termination requirements may be set determining when the optimization method may return a response. For example termination may occur when a maximum number of iterations have been performed, a target fitness score has been reached or the like. When a given termination requirement is met 1008, at least one optimal network configuration, for example having a low total expected cost $F(s)$ may be recommended 1016.

Alternatively, if the termination requirement has not been met after calculating fitness scores for each candidate, a time out check may be applied 1010. If the termination requirement has not been met within a time limit, a report may be issued that no suitable suggestion has been found 1014.

Where the termination requirement has not been met and the time limit not exceeded, the optimization method may select a new set of candidate network configurations 1012, for example based upon the candidate network configurations of the previous set which have the best fitness scores. Various methods are known for selecting a new set of candidate network configurations such as using nearest neighbors, mutation, cross-over or the like. The method may proceed to the next interaction by calculating the fitness score for each network configuration of the new set.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A computer implemented method for providing expected cost for locating a leak in a fluid network, the method comprising:

detecting, by a processing device, a leak condition in a flow monitoring zone by the processing device receiving data from a plurality of sensors within a fluid network;

generating, by the processing device, a network trace of the flow monitoring zone, the network trace including data associated with a plurality of valves and a plurality of pipe segments;

identifying, by the processing device, a plurality of sections of the flow monitoring zone in the network trace, wherein the plurality of sections are determined based upon the locations of one or more valves in the flow monitoring zone;

selecting, by the processing device, a step testing procedure from a plurality of step testing procedures based on the identified sections of the flow monitoring zone, the step testing procedure including the identified sections arranged into a decision tree based on the location of valves in the flow monitoring zone, wherein selecting a step testing procedure comprises the processing device:

identifying one or more leaf sections present within the step testing procedure;

computing a probability $prob_{loc}$ of a leak being located in the section of the fluid network and computing a cost $f_{loc}$ of locating the leak in the section of the fluid network for each leaf section of the flow monitoring zone; and calculating the sum of the products of $prob_{loc}$ and $f_{loc}$ for all leaf nodes of the step testing procedure, said sum being the expected cost of locating the leak in the fluid network; and executing, by the processing device, the step testing procedure based on the expected cost of locating the leak, wherein executing the step testing comprises isolating the identified sections by the processing device remotely shutting a plurality of valves within the flow monitoring zone and determining if a leak is present within the sections based upon data received from a plurality of sensors within a fluid network.

2. The method of claim 1 wherein the step of determining the cost $f_{loc}$ of locating a leak in a section of the fluid network comprises at least one of:

determining a valve configuration cost $f_{valves}$ due to closing and reopening valves during the step testing procedure;

determining a shutdown costs $f_{shut}$ due to shutting down service during the step testing procedure;

determining a loss cost $f_{loss}$ due to expenses incurred as a result of the leak itself during the step testing procedure; and determining an inspection cost $f_{inspect}$ incurred by the inspection of the associated section of the fluid network.

3. The method of claim 1 wherein said probability $prob_{loc}$ of a leak being located in an associated section of the fluid network is determined by analyzing historical data stored in a database.

4. The method of claim 1 wherein said probability $prob_{loc}$ of a leak being located in an associated section of the fluid network is determined by analyzing flow data obtained from at least one network fluid monitor.

5. The method of claim 1 wherein the step of executing a step testing procedure comprises performing an optimization algorithm on a set of step testing procedures.

6. The method of claim 5 wherein the step of selecting a step testing procedure further comprises using expected cost as a target function.

7. The method of claim 1 wherein the step of selecting a step testing procedure comprises:

calculating an expected cost value for the plurality of step testing procedures for the fluid network; and selecting the step testing procedure having the lowest expected cost out of said plurality of step testing procedures.

8. The method of claim 1 further comprising:

obtaining at least one possible leak type associated with the leak condition;

determining a predicted occurrence rate $rate_{leak}$ for each of said at least one possible leak type;

calculating expected cost $T(S)_{leak}$ of a step testing procedure for each possible leak type; and calculating the sum of the products of $rate_{leak}$ and $T(S)_{leak}$ for all leaf sections of the decision tree said sum being the total expected cost rate for the network configuration.

9. The method of claim 8 wherein said predicted occurrence rate $rate_{leak}$ is determined by analyzing historical data.

10. A system for providing expected cost for locating a leak in a fluid network, the system comprising:

a water utility network comprising a plurality of pipes and joints, the water utility network being divided into a plurality of flow monitoring zones;

a plurality of sensors located within the water utility network;

a processing device executing a water network analysis engine, the processing device operative to:

receive sensor data from the plurality of sensors;

detect a leak condition in a flow monitoring zone by the processing device receiving the sensor data;

generate a network trace of the flow monitoring zone including data associated with a plurality of valves and a plurality of pipe segments;

identify a plurality of sections of the flow monitoring zone in the network trace, wherein the plurality of sections are determined based upon the locations of one or more valves in the flow monitoring zone;

select a step testing procedure, from a plurality of step testing procedures, based on the identified sections of the flow monitoring zone, the step testing procedure including the identified sections arranged into a decision tree based on the location of valves in the flow monitoring zone, wherein selecting a step testing procedure comprises:

identify one or more leaf sections present within the step testing procedure;

compute a probability $prob_{loc}$ of a leak being located in the section of the fluid network and computing a cost $f_{loc}$ of locating the leak in the section of the fluid network for each leaf section of the flow monitoring zone; and calculate the sum of the products of $prob_{loc}$ and $f_{loc}$ for all leaf nodes of the step testing procedure, said sum being the expected cost of locating the leak in the fluid network; and execute the step testing procedure based on the expected cost of locating the leak, wherein executing the step testing comprises isolating the identified sections by the processing device remotely shutting a plurality of valves within the flow monitoring zone and determining if a leak is present within the sections based upon data received from a plurality of sensors within a fluid network.

11. The system of claim 10 wherein the water analysis engine determines the cost $f_{loc}$ of locating a leak in a section of the fluid network by determining at least one of:

a valve configuration cost $f_{valves}$ due to closing and reopening valves during the step testing procedure;

a shutdown cost $f_{shut}$ due to shutting down service during the step testing procedure;

a loss cost $f_{loss}$ due to expenses incurred as a result of the leak itself during the step testing procedure; and an inspection cost $f_{inspect}$ incurred by the inspection of the associated section of the fluid network.

12. The system of claim 10 wherein the water analysis engine determines the probability $prob_{loc}$ of a leak being located in an associated section of the fluid network by analyzing historical data stored in a database.

13. The system of claim 10 wherein the water analysis engine determines said probability $prob_{loc}$ of a leak being located in an associated section of the fluid network by analyzing flow data obtained from at least one network fluid monitor.

14. The system of claim 10 wherein the water analysis engine executes a step testing procedure by performing an optimization algorithm on a set of step testing procedures.

15. The system of claim 14 wherein the water analysis engine selects a step testing procedure by using expected cost as a target function.

16. The system of claim 10 wherein the water analysis engine selects a step testing procedure by calculating an expected cost value for the plurality of step testing procedures for the fluid network and selecting the step testing procedure having the lowest expected cost out of said plurality of step testing procedures.

17. The system of claim 10 wherein the water analysis engine is further operative to:

obtain at least one possible leak type associated with the leak condition;

determine a predicted occurrence rate $rate_{leak}$ for each of said at least one possible leak type;

calculate expected cost $T(S)_{leak}$ of a step testing procedure for each possible leak type; and calculate the sum of the products of $rate_{leak}$ and $T(S)_{leak}$ for all leaf sections of the decision tree said sum being the total expected cost rate for the network configuration.

18. The system of claim 17 wherein said predicted occurrence rate $rate_{leak}$ is determined by analyzing historical data.

* * * * *